United States Patent
Wang et al.

(10) Patent No.: US 8,980,367 B2
(45) Date of Patent: Mar. 17, 2015

(54) METHOD FOR MAKING ANODE ACTIVE MATERIAL

(71) Applicants: Li Wang, Beijing (CN); Xiang-Ming He, Beijing (CN); Wen-Ting Sun, Beijing (CN); Jian-Jun Li, Beijing (CN)

(72) Inventors: Li Wang, Beijing (CN); Xiang-Ming He, Beijing (CN); Wen-Ting Sun, Beijing (CN); Jian-Jun Li, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 108 days.

(21) Appl. No.: 13/650,300

(22) Filed: Oct. 12, 2012

(65) Prior Publication Data
US 2013/0224369 A1    Aug. 29, 2013

(30) Foreign Application Priority Data

Feb. 24, 2012  (CN) .......................... 2012 1 0043044

(51) Int. Cl.
| | | |
|---|---|---|
| *B05D 5/12* | (2006.01) | |
| *H01M 4/04* | (2006.01) | |
| *B82Y 30/00* | (2011.01) | |

(52) U.S. Cl.
CPC ............... *H01M 4/04* (2013.01); *Y02E 60/122* (2013.01); *Y02E 60/12* (2013.01); *B82Y 30/00* (2013.01)
USPC ......... 427/69; 427/115; 427/124; 427/255.12

(58) Field of Classification Search
USPC ............... 427/69, 115, 124, 255.12; 502/101, 502/180, 208
See application file for complete search history.

(56) References Cited

U.S. PATENT DOCUMENTS

| 2,200,743 | A  | * | 5/1940 | Hardy ........................... 148/240 |
| 2008/0038626 | A1 | * | 2/2008 | Park et al. ........................ 429/50 |
| 2009/0286156 | A1 | * | 11/2009 | Gillot et al. .................... 429/207 |
| 2010/0239905 | A1 | * | 9/2010 | Wang et al. .................... 429/213 |

FOREIGN PATENT DOCUMENTS

| CN | 102244288 | 11/2011 |
| TW | 201123588 | 7/2011 |

OTHER PUBLICATIONS

Park et al. "Black Phosphorus and its Composite for Lithium Rechargeable Batteries", Advanced Materials, vol. 19, 2007, pp. 2465-2468.*

* cited by examiner

*Primary Examiner* — Brian K Talbot
(74) *Attorney, Agent, or Firm* — Novak Druce Connolly Bove + Quigg LLP

(57) ABSTRACT

A method for making an anode active material is described. The anode active material includes a phosphorus composite material. In the method, a solid-state red phosphorus and a porous conductive carbon material are provided. The solid-state red phosphorus and the porous conductive carbon material are spaced disposed in a vessel and the vessel is sealed. The solid-state red phosphorus is sublimed by heating the vessel to make the sublimed red phosphorus diffused in the porous conductive carbon material. The sublimed red phosphorus is condensed. The condensed red phosphorus adsorbs in the porous conductive carbon material to form the phosphorus composite material.

15 Claims, 10 Drawing Sheets

METHOD FOR MAKING ANODE ACTIVE MATERIAL

This application claims all benefits accruing under 35 U.S.C. §119 from China Patent Application No. 201210043044.3, filed on Feb. 24, 2012, in the China Intellectual Property Office, the contents of which are hereby incorporated by reference.

BACKGROUND

1. Technical Field

The present disclosure relates to anode active materials. Specially, the present disclosure relates to phosphorus composite material as the anode active materials.

2. Description of Related Art

Anode active materials are the main components of lithium ion batteries. Elemental phosphorus as anode active material has a theoretical specific capacity of about 2594 milliamp hours per gram (mAh/g), which is much higher than the theoretical specific capacities of graphite (372 mAh/g) and elemental tin (992 mAh/g).

The elemental phosphorus has three major allotropes: white phosphorus, red phosphorus, and black phosphorus. Among these allotropes, white phosphorus is chemically unstable. Black phosphorus is the most thermodynamically stable, but difficult to synthesize. Red phosphorus is stable and abundant in nature, and has a low cost. However, because of its electronic insulation, an experimental capacity of the red phosphorus is far lower than the theoretical value and fades considerably after a few cycles.

What is needed, therefore, is to provide a method for making an anode active material using the red phosphorus which can overcome the electronic insulation of the red phosphorus and improve the capacity and stable cycling of the red phosphorus.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
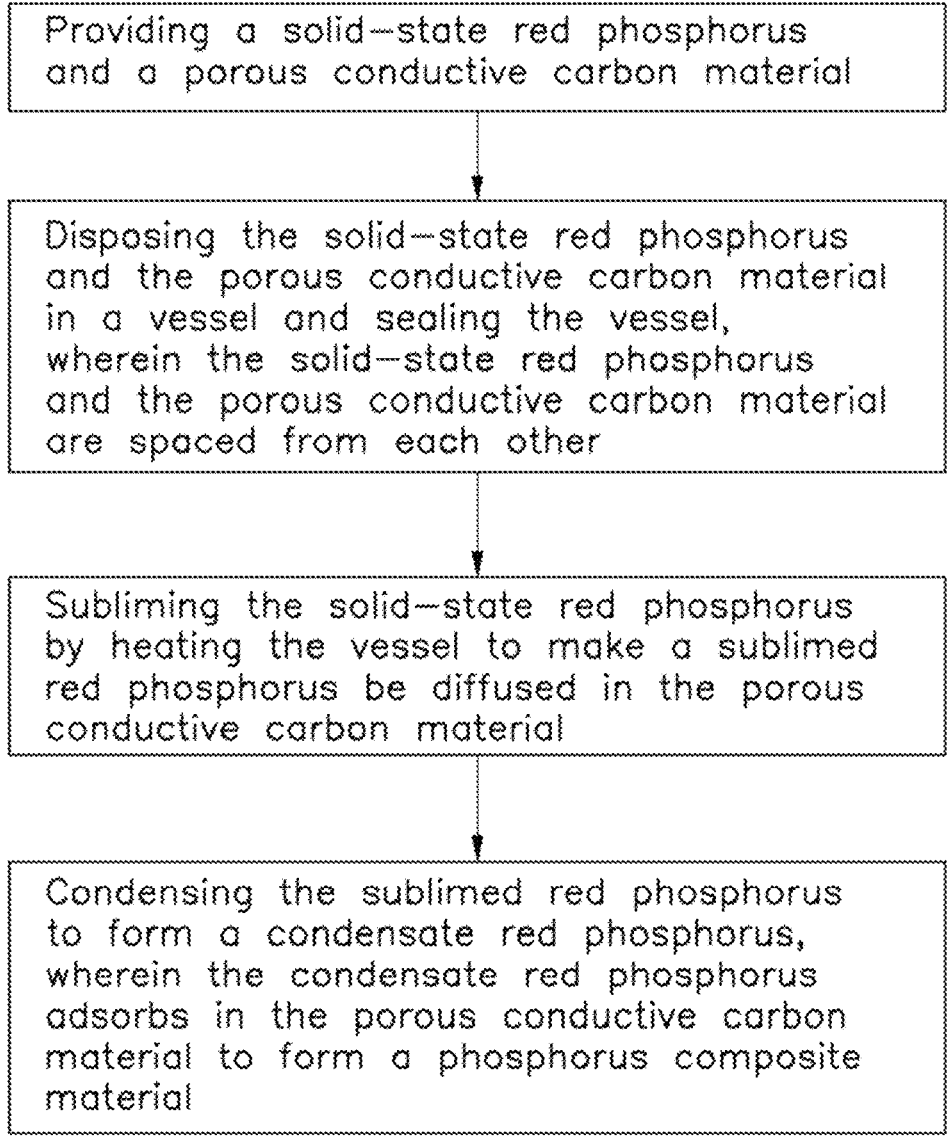
FIG. 1 is a flowchart of one embodiment of a method for making an anode active material.

Referring to FIG. 1, one embodiment of a method for making an anode active material is provided. The anode active material includes a phosphorus composite material. The method includes the following steps:

S1, providing a solid-state red phosphorus and a porous conductive carbon material;

S2, disposing the solid-state red phosphorus and the porous conductive carbon material in a vessel and sealing the vessel, wherein the solid-state red phosphorus and the porous conductive carbon material are spaced from each other;

S3, subliming the solid-state red phosphorus by heating the vessel to make the sublimed red phosphorus be diffused in the porous conductive carbon material; and S4, condensing the sublimed red phosphorus, and wherein the condensate red phosphorus adsorbed in the porous conductive carbon material to form the phosphorus composite material.

In step S1, the porous conductive carbon material has a plurality of micropores, and the porous conductive carbon material itself can be a porous microstructure, such as porous carbon, charcoal, carbon black, mesophase carbon micro beads, hollow carbon fiber, or carbon nanotubes with open ends. The porous conductive carbon material can be an elemental carbon or allotropes of the elemental carbon. A diameter of the plurality of micropores can be in a range from about 0.1 nanometers to about 50 nanometers to make the sublimed red phosphorus be diffused and adsorbed in the plurality of micropores. A pore volume of the porous conductive carbon material can be in a range from about 0.05 cubic centimeters per gram ($cm^3/g$) to about 3 $cm^3/g$. A specific surface area of the porous conductive carbon material can be in a range from about 500 square meters per gram ($m^2/g$) to about 1000 $m^2/g$. The porous conductive carbon material can be exhibited as powders, flakes, particles, fibers, or combinations thereof. A diameter of the powders or particles of porous conductive carbon material can be in a range from about 100 nanometers to about 20 micrometers. It is to be understood that the individual particles themselves are porous.

The porous conductive carbon material also can be a carbon nanotube array or a carbon nanotube paper. The carbon nanotube array includes a plurality of carbon nanotubes formed by a method such as chemical vapor deposition or arc discharge. The carbon nanotube paper can include at least one carbon nanotube film. The at least one carbon nanotube film is capable of forming a free-standing structure such that it can be directly laid on a current collector to make an electrode. The term "free-standing structure" refers a structure that does not have to be supported by a substrate. For example, a free-standing structure can sustain the weight of itself when it is hoisted by a portion thereof without any significant damage to its structural integrity.

The carbon nanotube film can include a plurality of carbon nanotubes disorderly distributed therein. The plurality of carbon nanotubes can be entangled with each other. The adjacent carbon nanotubes are combined and entangled by van der Waals attractive force therebetween, thereby forming an entangled structure/microporous structure. It is understood that the carbon nanotube film is very microporous. Sizes of the micropores can be less than 10 micrometers. In one embodiment, the carbon nanotube film is a flocculated carbon nanotube film.

The carbon nanotube film also can include a plurality of carbon nanotubes orderly distributed therein. Specifically, the carbon nanotube film can include a plurality of carbon nanotube drawn films crossed and overlapped with other. An angle can exist between the orientations of carbon nanotubes in adjacent carbon nanotube drawn films to form the plurality of micropores. The angle can be in a range from about 0 degrees to about 90 degrees. The carbon nanotube drawn film is drawn from a carbon nanotube array. A majority of carbon nanotubes in the carbon nanotube drawn film substantially extends along the same direction and parallel to a surface of the carbon nanotube drawn film. The majority of carbon nanotubes are joined end to end by van der Waals attractive forces and each carbon nanotube is joined to adjacent carbon nanotubes side by side by van der Waals attractive forces therebetween. The crossed and overlapped carbon nanotube drawn films further can be treated with an organic solvent. A plurality of carbon nanotube strings will be formed by adjacent carbon nanotubes in each carbon nanotube drawn film due to a surface tension of the organic solvent after being treated with the organic solvent. The plurality of micropores will be formed by carbon nanotube strings in adjacent two carbon nanotube drawn film. The plurality of micropores are used for the red phosphorus deposition.

In one embodiment, the porous conductive carbon material is the porous carbon in a powder form. The pore volume of the porous carbon is about 0.186 $cm^3/g$, and the specific surface area of the porous carbon is about 916.9 $m^2/g$. The porous carbon can be fabricated by physically activating the carbon (such as gas activating carbon) or chemically activating the carbon. In another embodiment, the porous conductive carbon material is the carbon nanotube paper.

The solid-state red phosphorus can be in powder or particle form. A diameter of the solid-state red phosphorus can be in a range from about 10 nanometers to about 100 micrometers. In one embodiment, the specific surface area of the solid-state red phosphorus is about 2.46 $m^2/g$, and the pore volume of the solid-state red phosphorus is about 0.009 $cm^3/g$.

A mass ratio of the solid-state red phosphorus and the porous conductive carbon material can be in a range from about 0.2:1 to about 6:1. In one embodiment, the mass ratio is about 5:1.

In step S2 , inside the sealed vessel is an oxygen free environment, such as a vacuum environment or the sealed vessel is filled with an inert gas. The inert gas can be at least one of nitrogen gas and argon gas. In one embodiment, the sealed vessel is filled with argon gas. The vessel is resistant to a high temperature and does not react with the solid-state red phosphorus and the porous conductive carbon material. In addition, a material of the vessel is selected from materials which help prevent adherence of the red phosphorus to the vessel, such as stainless steel.

A location relation between the solid-state red phosphorus and the porous conductive carbon material is not limited except that the solid-state red phosphorus and the porous conductive carbon material are spaced from each other. "Spaced", in this context, means that the solid-state red phosphorus does not contact the porous conductive carbon material, but the sublimed red phosphorus is capable of diffusing and adsorbing in the porous conductive carbon material. In one embodiment, the solid-state red phosphorus and the porous conductive carbon material are directly faced with each other. The spaced between the solid-state red phosphorus and the porous conductive carbon material prevents the adsorption of the red phosphorus occurring mostly on an outer surface of the porous conductive carbon material. On the contrary, a majority of the red phosphorus can adsorb in the plurality of micropores of the porous conductive carbon material in the phosphorus composite material by disposing the red phosphorus and the porous conductive carbon material spaced apart. The solid-state red phosphorus can be disposed in the bottom of the vessel, and the porous conductive carbon material can be disposed above and spaced from the solid-state red phosphorus. In addition, a part of the solid-state red phosphorus can be disposed above the porous conductive carbon material and the other part of the solid-state red phosphorus is disposed below the porous conductive carbon material. In one embodiment, the porous conductive carbon material is the carbon nanotube array or the carbon nanotube paper. A part of the solid-state red phosphorus is disposed above the carbon nanotube array or the carbon nanotube paper, and the other part of the solid-state red phosphorus is disposed below the carbon nanotube array or the carbon nanotube paper.

A porous conductive carbon material layer formed by the porous conductive carbon material and a red phosphorus layer formed by the solid-state red phosphorus can be disposed in the vessel and spaced apart from each other. The porous conductive carbon material powders, particles, or fibers can be uniformly spaced and disposed along an extending direction of the porous conductive carbon material layer. The solid-state red phosphorus can also be spaced and disposed in the red phosphorus layer along the extending direction thereof. The spaced disposed porous conductive carbon material and the spaced disposed solid-state red phosphorus can increase a surface area thereof to make the sublimed red phosphorus mostly adsorbed in the micropores of the porous conductive carbon material. In one embodiment, the carbon nanotube paper is used as the porous conductive carbon material, and two opposite ends of the carbon nanotube paper along the extending direction can be fixed in the vessel and suspend above the solid-state red phosphorus. A middle portion of the carbon nanotube paper needs no support because of the free-standing property. Therefore, the contact area of the sublimed red phosphorus and the carbon nanotube paper can be increased.

Figure 2:
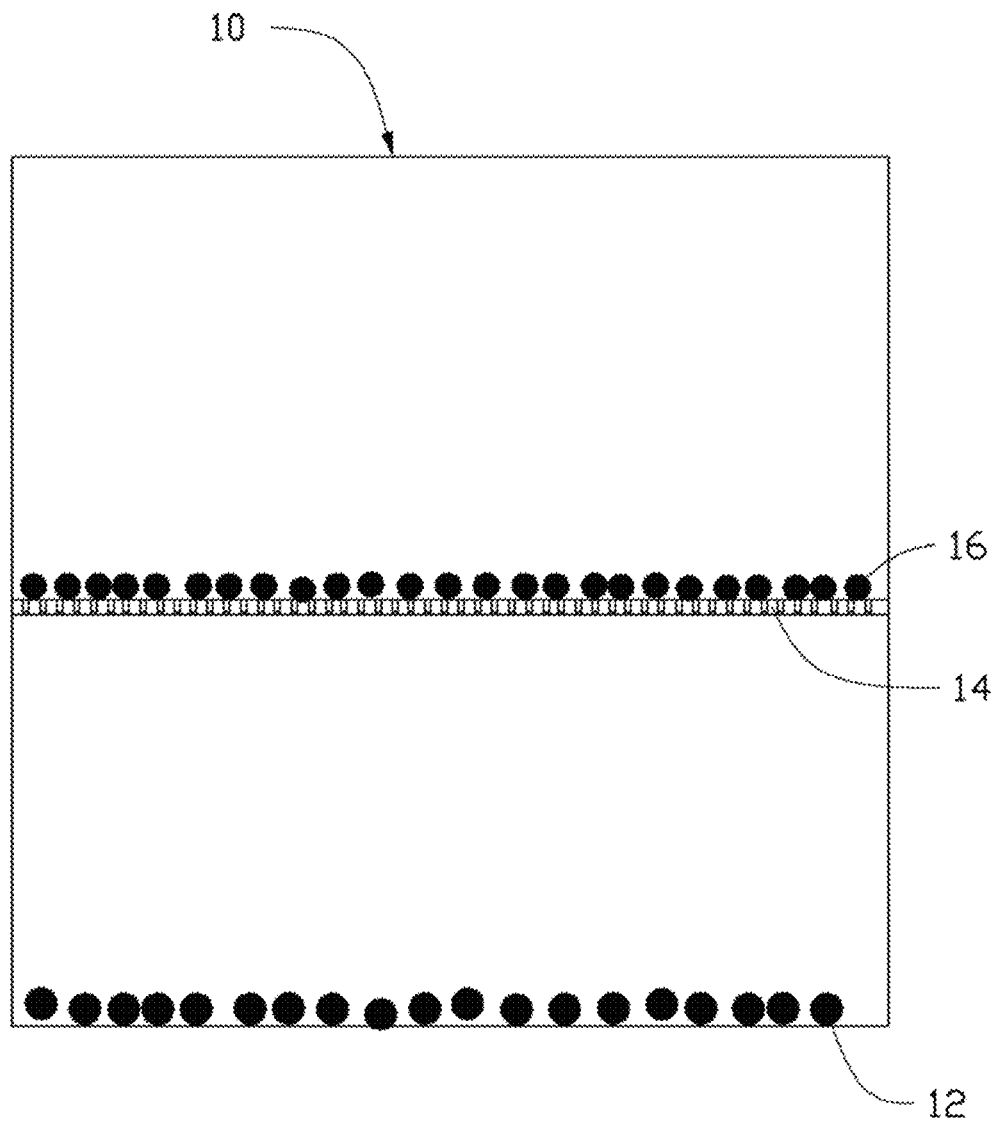
FIG. 2 is a schematic view of an inside structure of a vessel used for making the anode active material.

Referring to FIG. 2, in one embodiment, a layer of the solid-state red phosphorus 12 is disposed on the bottom of the vessel 10. A bearing structure 14 is fixed above the solid-state red phosphorus 12 and used for bearing the porous conductive carbon material 16. The bearing structure 14 can be a mesh having a plurality of pores. A diameter of the pores is smaller than the diameter of the porous conductive carbon material 16.

In addition, the bearing structure 14 also can be a container with one open end, such as a baker or a glass plate. The bearing structure 14 is filled with the porous conductive carbon material 16 and disposed in the vessel 10. The solid-state red phosphorus 12 is disposed outside the bearing structure 14 and spaced from the porous conductive carbon material 16 by the bearing structure 14 with one open end.

In step S3, the solid-state red phosphorus can be heated to sublime. A heating temperature is higher than a subliming temperature of the solid-state red phosphorus, and can be in a range from about 250° C. to about 600° C. A time period of the heating process can be in a range from about 5 hours to about 48 hours. In one embodiment, the sealed vessel is slowly heated to about 450° C., and continuously heated at 450° C. for about 15 hours to make the solid-state red phosphorus sublime, and the sublimed red phosphorus and the porous conductive carbon material sufficiently contact each other. The majority of sublimed red phosphorus is diffused in the plurality of micropores under capillary forces and a pressure difference in and out of the vessel.

In step S4, the sublimed red phosphorus is condensed back to a solid state, and is deposited and tightly adsorbed in an inside wall of the plurality of micropores of the porous conductive carbon material to form the phosphorus composite material. The phosphorus composite material includes two parts. One part is the porous conductive carbon material as a conductive matrix. The other part is the red phosphorus uniformly deposited and adsorbed in the plurality of micropores of the porous conductive carbon material. In addition, only a small amount of red phosphorus adsorbs on an outer surface of the porous conductive carbon material in the phosphorus composite material. A mass percentage of the red phosphorus in the phosphorus composite material can be in a range from about 25 wt % to about 60 wt %. A diameter of the red phosphorus in the phosphorus composite material can be in a range from about 5 nanometers to about 500 nanometers.

Figure 3:
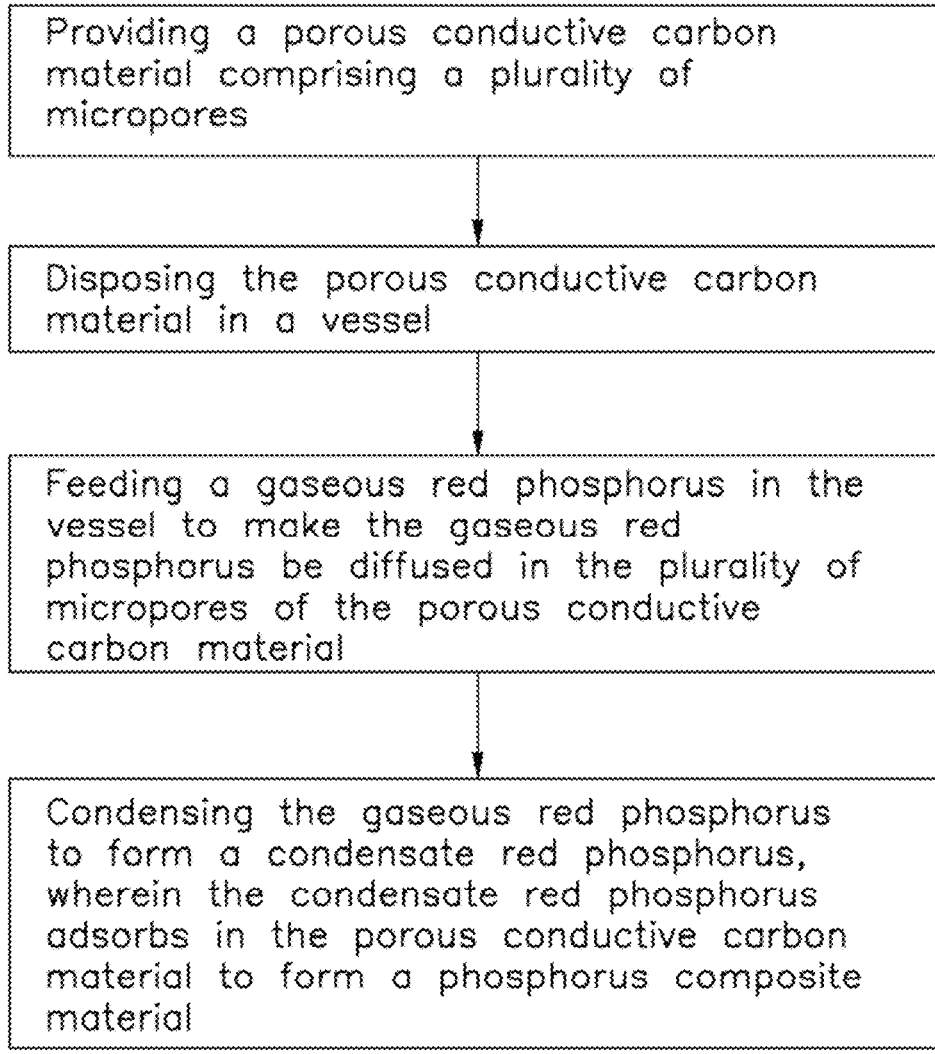
FIG. 3 is a flowchart of another embodiment of a method for making the anode active material.

Referring to FIG. 3, another embodiment of a method for making the phosphorus composite material includes the following steps:

T1, disposing the porous conductive carbon material in the vessel;

T2, feeding a gaseous red phosphorus in the vessel to diffuse the gaseous red phosphorus in the plurality of micropores of the porous conductive carbon material; and T3, condensing the gaseous red phosphorus and the condensed red phosphorus adsorbing in the porous conductive carbon material to form the phosphorus composite material.

The method further includes a step of heating the vessel during feeding the gaseous red phosphorus in the vessel. The heating process is to make the gaseous red phosphorus fully contact the porous conductive carbon material and mostly diffused in the plurality of micropores of the porous conductive carbon material.

Figure 4:
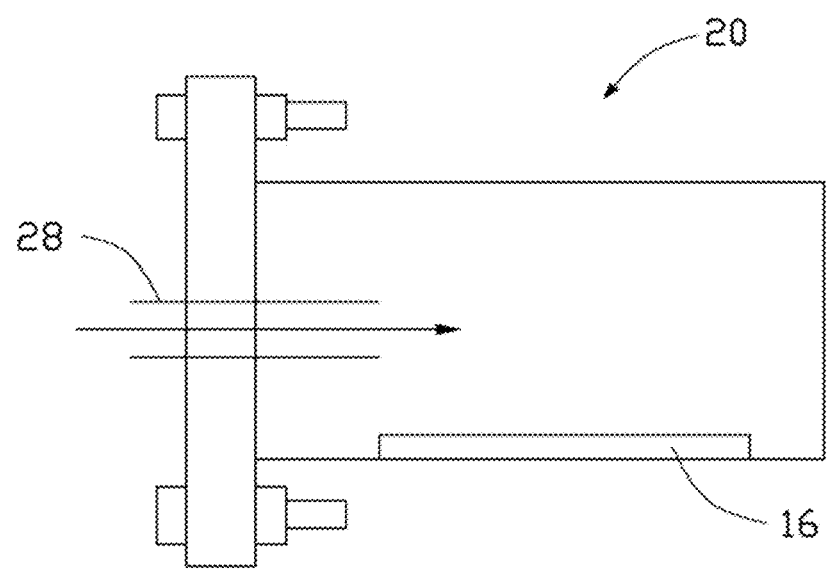
FIG. 4 is a schematic view of an inside structure of a vessel used for making the anode active material by the method of FIG. 3.

The vessel can include a gas inlet. Referring to FIG. 4, a vessel 20 includes a gas inlet 28 for feeding the gaseous red phosphorus. The porous conductive carbon material 16 is disposed in the vessel 20. In the method, the majority of the gaseous red phosphorus can diffuse in the plurality of the micropores of the porous conductive carbon material 16 because of a direct contact between the gaseous red phosphorus and the porous conductive carbon material 16.

The above methods prevent the solid-state red phosphorus from directly contacting the porous conductive carbon material before the phosphorus composite material is fabricated. Therefore, the majority of red phosphorus can be adsorbed in the micropores of the porous conductive carbon material. If used in the lithium ion battery, chances of a side reaction between the red phosphorus and an electrolyte can be decreased. Therefore, a loss of the red phosphorus which acts as an active material can be decreased.

EXAMPLE

Phosphorus Composite Material

The solid-state red phosphorus is washed with a distilled water to remove oxides and dried. The pore volume of the solid-state red phosphorus is about 0.009 cm$^3$/g and the specific surface area of the solid-state red phosphorus is about 2.46 m$^2$/g. About 10 g of the dried solid-state red phosphorus is put in the bottom of the stainless steel vessel. About 2 g of porous carbon is put into a small baker. The pore volume of the porous carbon is about 0.186 cm$^3$/g and the specific surface area of the porous carbon is about 916 m$^2$/g. The baker is then put into the stainless steel vessel. The vessel is sealed in an argon-filled glove box. The sealed vessel is heated at about 450° C. for about 15 hours. The heated vessel is then cooled down to a room temperature to obtain about 3 g of the phosphorus composite material. The pore volume of the phosphorus composite material is about 0.186 cm$^3$/g and the specific surface area of the phosphorus composite material is about 916 m$^2$/g. The specific surface area is calculated by Brunauer-Emmett-Teller method, and the pore volume is calculated by Barrett-Joyner-Halenda method. The content of the red phosphorus in the phosphorus composite material is analyzed to be about 30.56 wt % by weight, wherein the content of the red phosphorus deposited in the plurality of micropores is analyzed to be about 29.4 wt %.

Figure 5:
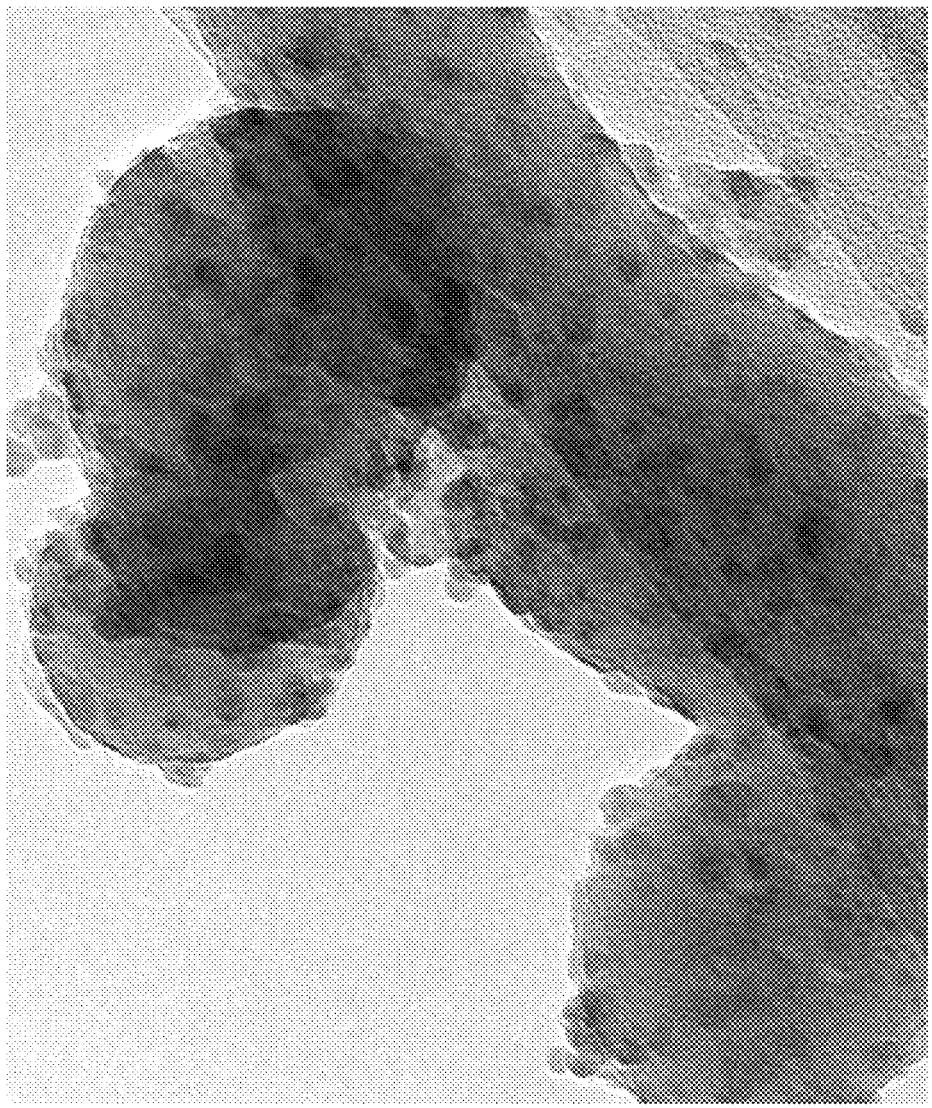
FIG. 5 is a photo showing a transmission electron microscope image of a phosphorus composite material made by one embodiment of the method.
Figure 6:
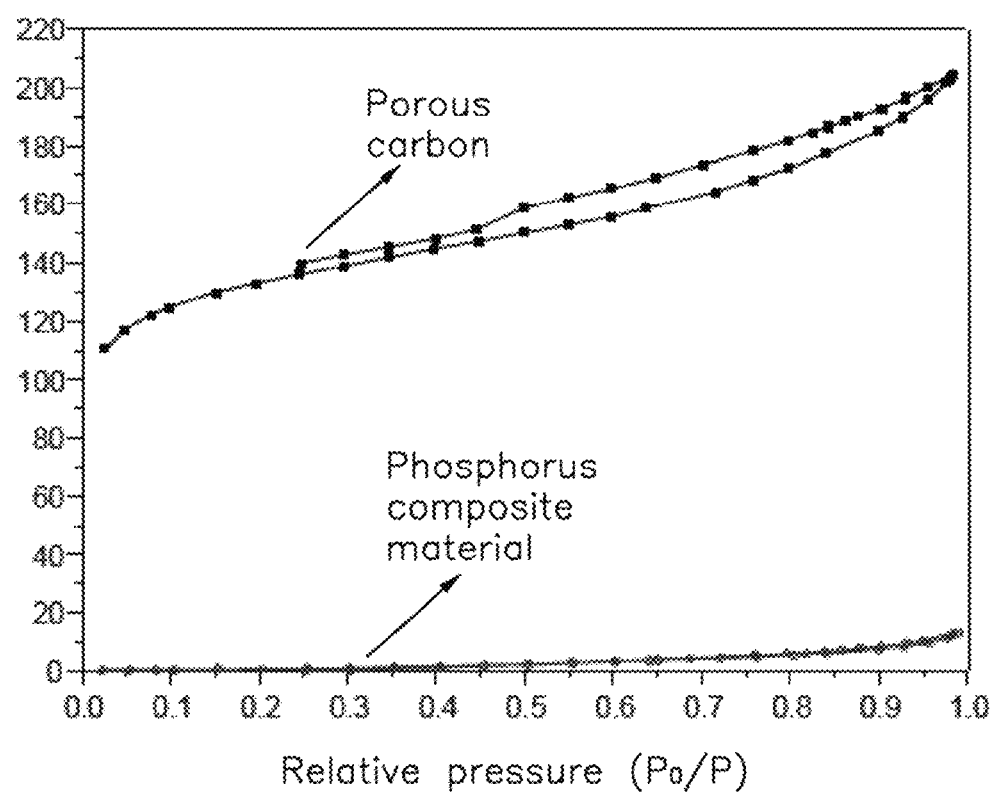
FIG. 6 is a graph comparing $N_2$ adsorption-desorption isotherms of a porous carbon and the phosphorus composite material.

Referring to FIG. 5, nano-size red phosphorus particles are uniformly distributed in the phosphorus composite material. In addition, an elemental mapping result also indicates that most of the red phosphorus is homogeneously distributed in the porous carbon, while only a small amount of red phosphorus is located on an outer surface of the porous carbon. Referring to FIG. 6, an experiment of N$_2$ adsorption-desorption isotherms of the porous carbon and phosphorus composite material also demonstrates that the micropores in the porous carbon are mostly filled by the deposited red phosphorus.

Figure 7:
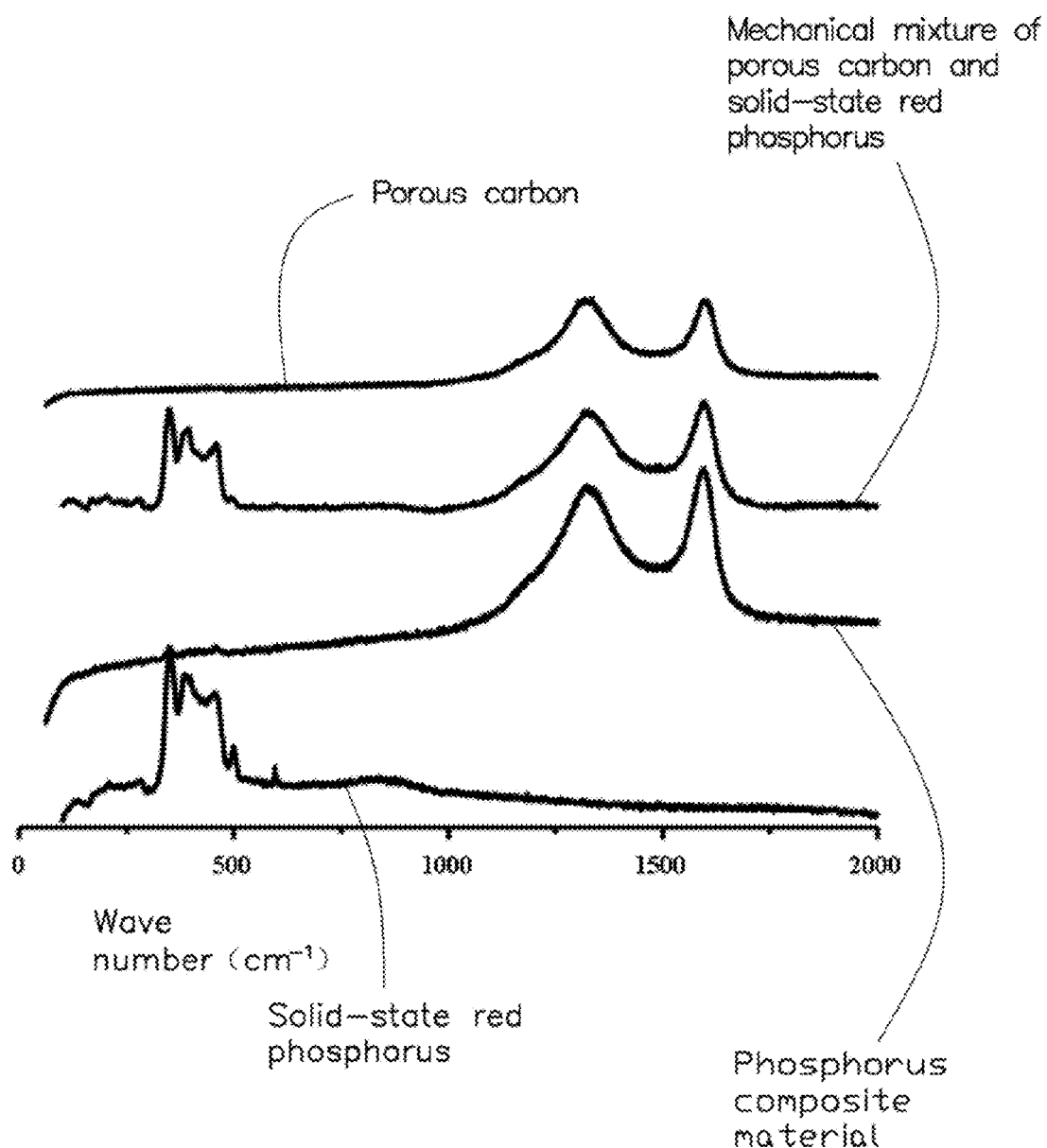
FIG. 7 is a graph comparing Raman spectra of the phosphorus composite material, the porous carbon, a solid-state red phosphorus, and a mechanical mixture of the porous carbon and the solid-state red phosphorus.
Figure 8:
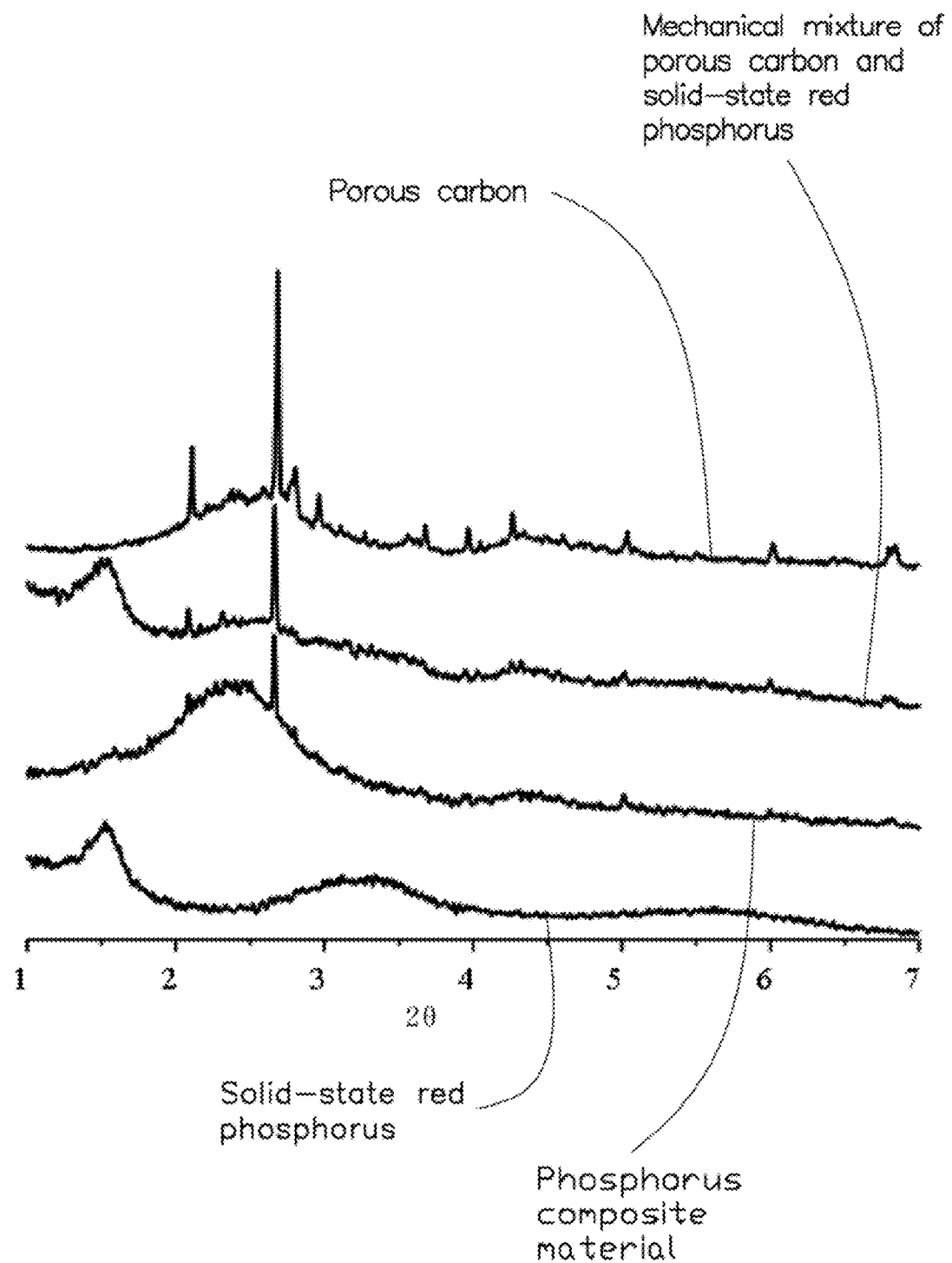
FIG. 8 is a graph comparing X-ray diffraction patterns of the phosphorus composite material, the porous carbon, the solid-state red phosphorus, and the mechanical mixture of the porous carbon and the solid-state red phosphorus.

Referring to FIG. 7 and FIG. 8, characteristic peaks of the phosphorus composite material are similar to the characteristic peaks of the porous carbon. In addition, there are no similar characteristic peak between the phosphorus composite material and the red phosphorus in view of the Raman spectra and the XRD pattern. This result indicates that the red phosphorus is physically adsorbed in the micropores of the porous carbon.

Anode of Lithium Ion Battery

The phosphorus composite material is used as the anode active material to fabricate the anode of a lithium ion battery. A slurry containing a mass percentage of about 80 wt % of the phosphorus composite material, about 10 wt % of an acetylene black, and about 10 wt % of Polyacrylonitrile is provided. The slurry is coated on a surface of a nickel mesh which is used as a current collector. The nickel mesh with the slurry coated thereon is vacuum dried at about 80° C. for about 12 hours to obtain the anode of the lithium ion battery.

Lithium Ion Battery

The lithium ion battery is assembled with the anode and a metallic lithium disk as electrodes, Celgard2400 porous film as separator. The electrolyte is a solution of 1 M LiPF$_6$ dissolved in a mixed solvent of ethylene carbonate (EC), dimethyl carbonate (DMC), and ethylene methyl carbonate (EMC) (1:1:1 by volume). Electrochemical performance tests of the lithium ion battery are performed alvanostatically with a current density of 100 mA/g between about 0.005 V and about 3.000 V.

Figure 9:
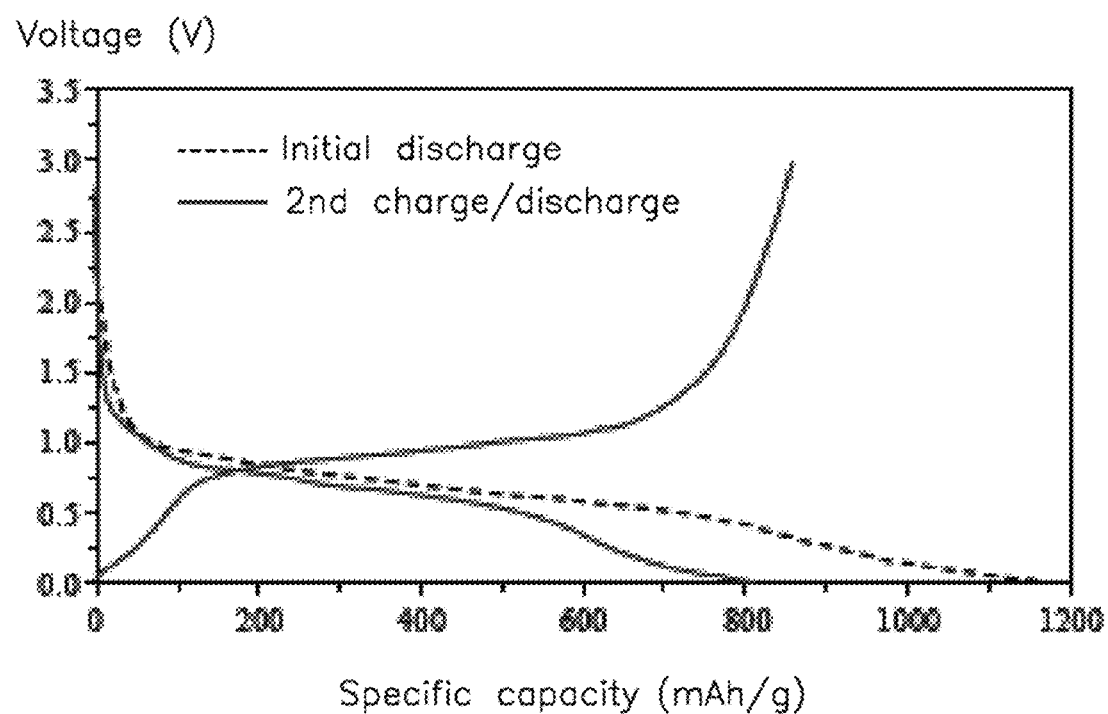
FIG. 9 is a graph of charge-discharge curves of a lithium ion battery using the phosphorus composite material as the anode active material.

Referring to FIG. 9, an initial discharge capacity of the lithium ion battery is about 1200 mAh/g. A charge capacity reaches to about 840 mAh/g and the discharge capacity exceeds to about 800 mAh/g after the second charging process. This result indicates that the lithium ion battery with the phosphorus composite material as the anode active material has a high charge-discharge reversible capacity. A reversible lithium storage capacity is about 2413 mAh calculated by taking the red phosphorus which indicates that a using rate of the red phosphorus reaches to about 92.85%. The reason for the high utility of the red phosphorus is that a loss of the red phosphorus is small during the charge-discharge process. The majority of the red phosphorus adsorbs in the micropores of the porous carbon.

Figure 10:
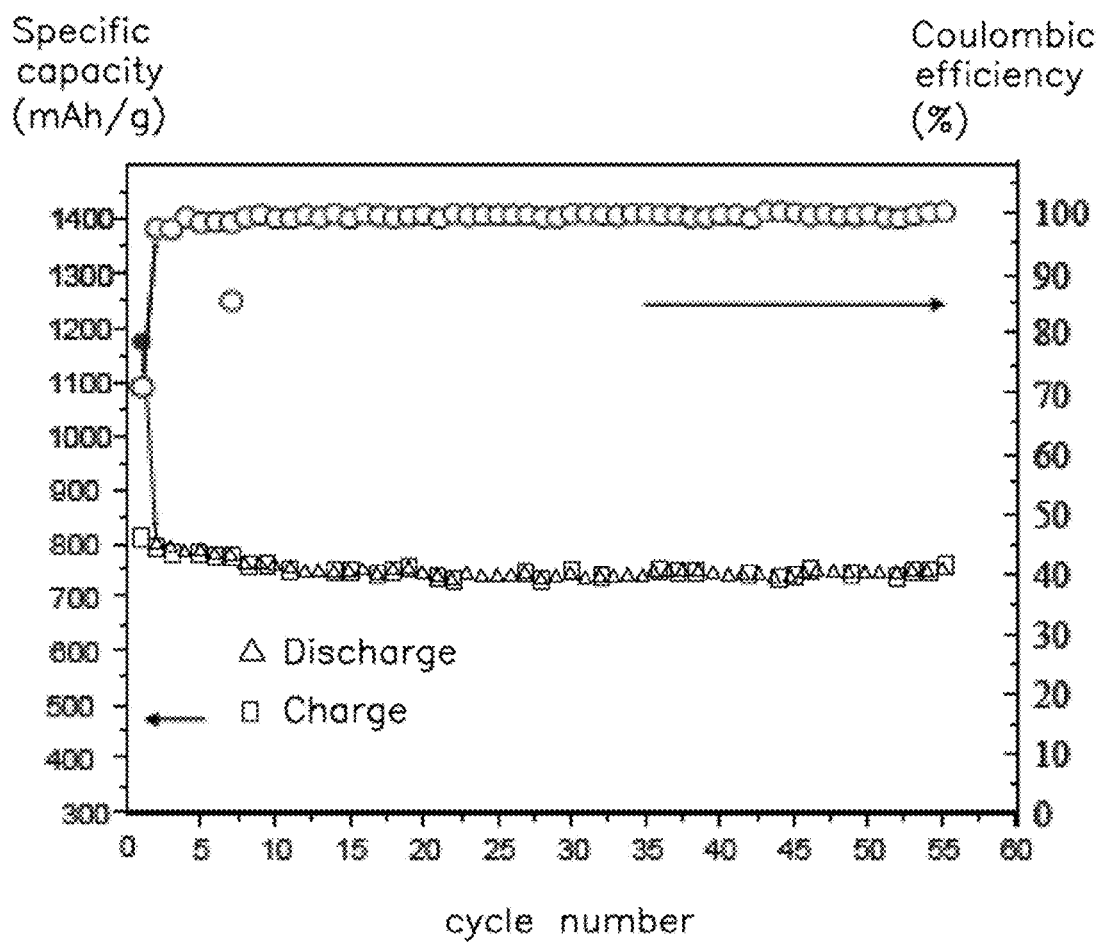
FIG. 10 is a graph of cycling performance test of the lithium ion battery.

Referring to FIG. 10, an initial coulombic efficiency of the lithium ion battery is about 70%. This is because a lithium consumption occurs during the forming of the solid electrolyte interface (SEI) at the initial charge/discharge process. However, the coulombic efficiency exceeds to about 99.6% after the third charge-discharge cycling process. In addition, the capacity retention of the lithium ion battery is higher than 87% from the 2nd to the 55th charge-discharge cycles. About 745 mAh/g capacity is retained after 50 charge-discharge cycles. The results showing in the FIG. 12 indicate that the lithium ion battery using the phosphorus composite material as the anode active material having a good cycling performance and capacity retention.

Comparative Example

A mechanical mixture of the red phosphorus and the porous carbon is used in the anode and the lithium ion battery.
Comparative Phosphorus Composite Material Porous carbon powders and red phosphorus powders are uniformly mixed to form a mixture by ball milling, wherein a mass ratio of the porous carbon powders and red phosphorus powders is about 1:1. The mixture is put in a reactor and heated to sublime the red phosphorus under a high purified $N_2$ atmosphere. The mixture is heated at about 470° C. for about 6 hours. The reactor is cooled down to a room temperature to form the comparative phosphorus composite material of the comparative example. A mass percentage of the red phosphorus in the comparative phosphorus composite material is about 30 wt %.
Comparative Lithium Ion Battery The fabricating method of the comparative lithium ion battery is substantially the same as the method in the example, except that the comparative phosphorus composite material is used as the anode active material. The initial discharge capacity of the comparative lithium ion battery is above 900 mAh/g. However, the discharge capacity decreases to about 500 mAh/g after 40 times cycles. This result indicates that the initial discharge capacity and the capacity retention of the embodiment of the phosphorus composite material is much better than the initial discharge capacity and the capacity retention of the comparative phosphorus composite material formed by a mechanical mixing of the red phosphorus and the porous carbon.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method for making an anode active material comprising following steps:
providing a solid-state red phosphorus and a porous conductive carbon material;
disposing the solid-state red phosphorus and the porous conductive carbon material in a vessel and sealing the vessel, wherein the solid-state red phosphorus and the porous conductive carbon material are spaced from each other;
subliming the solid-state red phosphorus by heating the vessel to make a sublimed red phosphorus be diffused in the porous conductive carbon material; and
condensing the sublimed red phosphorus to form a condensate red phosphorus.

2. The method of claim 1, wherein the condensate red phosphorus is adsorbed in the porous conductive carbon material to form a phosphorus composite material.

3. The method of claim 1, wherein the porous conductive carbon material comprises a plurality of micropores, a diameter of the plurality of micropores is in a range from about 0.1 nanometers to about 50 nanometers.

4. The method of claim 1, wherein a pore volume of the porous conductive carbon material is in a range from about 0.05 cubic centimeters per gram to about 3 cubic centimeters per gram.

5. The method of claim 1, wherein the porous conductive carbon material comprises a plurality of micropores, the porous conductive carbon material is selected from the group consisting of porous carbon, charcoal, carbon black, mesophase carbon micro beads, hollow carbon fiber, carbon nanotubes with open ends, and combinations thereof.

6. The method of claim 1, wherein the porous conductive carbon material is selected from the group consisting of a carbon nanotube array, a carbon nanotube paper, and combinations thereof.

7. The method of claim 6, wherein the carbon nanotube paper comprises a carbon nanotube film, the carbon nanotube film is a free-standing structure.

8. The method of claim 7, wherein the carbon nanotube film comprises a plurality of carbon nanotubes entangled with each other and joined with each other by van der Waals attractive forces.

9. The method of claim 7, wherein the carbon nanotube film comprises a plurality of carbon nanotube drawn films that are crossed and overlapped with each other, a majority of carbon nanotubes in each individual carbon nanotube drawn film substantially extend along the same direction.

10. The method of claim 1, wherein a mass ratio of the solid-state red phosphorus and the porous conductive carbon material is in a range from about 0.2:1 to about 6:1.

11. The method of claim 1, wherein the porous conductive carbon material is disposed above the solid-state red phosphorus in the vessel.

12. The method of claim 1, wherein the porous conductive carbon material is exhibited as powders, flakes, particles, fibers, or combinations thereof, and the powders, flakes, particles, fibers, or combinations thereof are spaced from each other.

13. The method of claim 1, wherein the porous conductive carbon material is supported on a surface of a mesh and spaced with the solid-state red phosphorus.

14. The method of claim 1, wherein the vessel is under vacuum or filled with an inert gas.

15. The method of claim 1, wherein a heating temperature is in a range from about 250° C. to about 600° C. for about 5 hours to about 48 hours.

* * * * *